United States Patent [19]
Okaniwa et al.

[11] Patent Number: 5,388,465
[45] Date of Patent: * Feb. 14, 1995

[54] ELECTROMAGNETIC FLOWMETER

[75] Inventors: Hiroshi Okaniwa; Ichiro Mitsutake; Atsushi Koshimizu, all of Tokyo, Japan

[73] Assignee: Yamatake-Honeywell Co., Ltd., Tokyo, Japan

[*] Notice: The portion of the term of this patent subsequent to Jun. 7, 2011 has been disclaimed.

[21] Appl. No.: 978,088

[22] Filed: Nov. 17, 1992

[51] Int. Cl.$^6$ .............................................. G01F 1/60
[52] U.S. Cl. ................... 73/861.17; 73/861.16; 73/861.12
[58] Field of Search ............ 73/861.12, 861.16, 861.17

[56] References Cited
U.S. PATENT DOCUMENTS 3,855,858 12/1974 Cushing .......................... 73/861.17
4,303,980 12/1981 Yard ................................ 73/861.17
4,644,799 2/1987 Tomita ............................. 73/861.12
4,658,653 4/1987 Tomita ............................. 73/861.12

FOREIGN PATENT DOCUMENTS 2137360 10/1984 United Kingdom ............ 73/861.16

Primary Examiner—Herbert Goldstein
Assistant Examiner—Elizabeth L. Dougherty
Attorney, Agent, or Firm—Waldron & Associates

[57] ABSTRACT

In an electromagnetic flowmeter for obtaining a signal corresponding to flow rate of conductive fluid in a magnetic field, a noise detector detects a noise superimposed on the fluid, and a timing signal generator produces timing of generating an exciting current to produce the magnetic field and timing of sampling electrical potential generated in electrodes in the fluid, based on the noise detected by the noise detector.

5 Claims, 12 Drawing Sheets

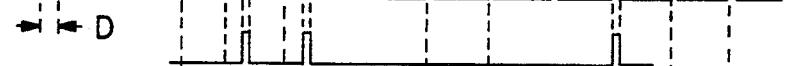
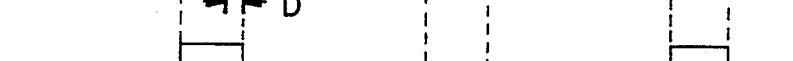
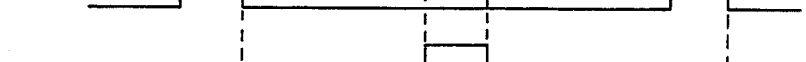
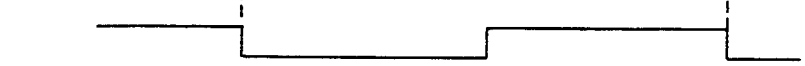

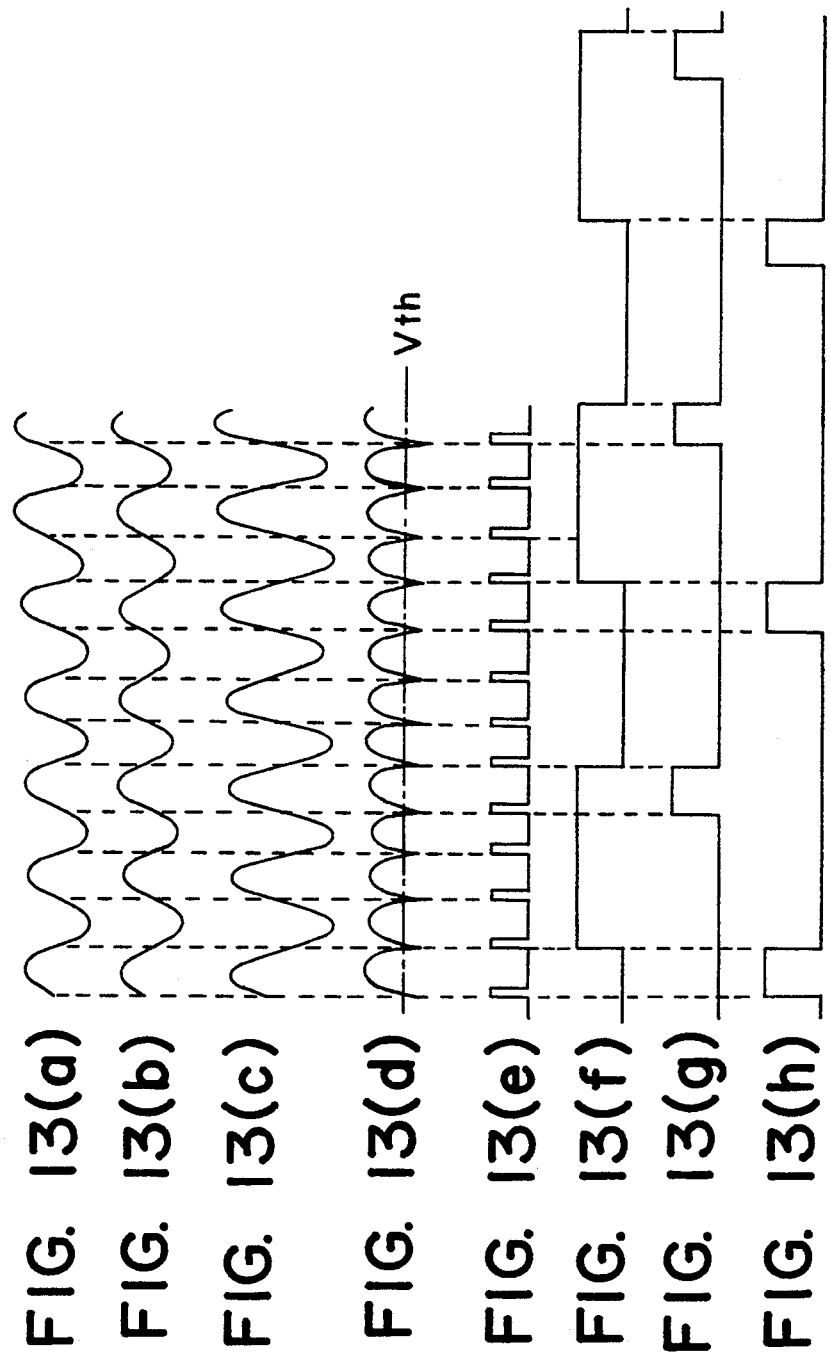

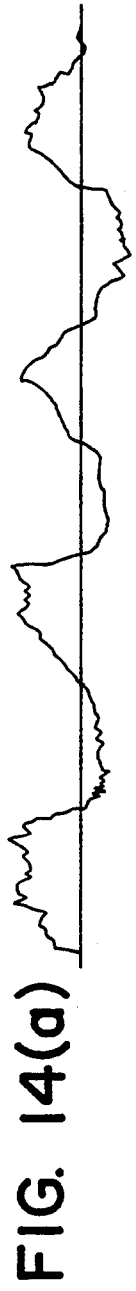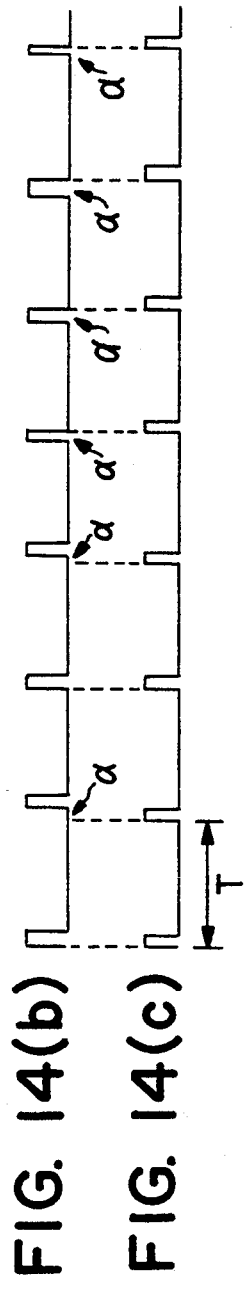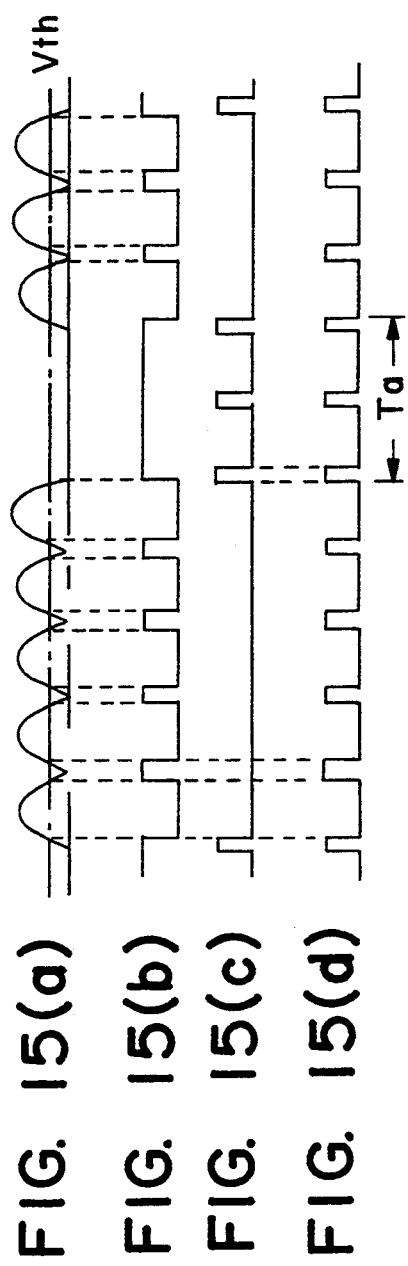

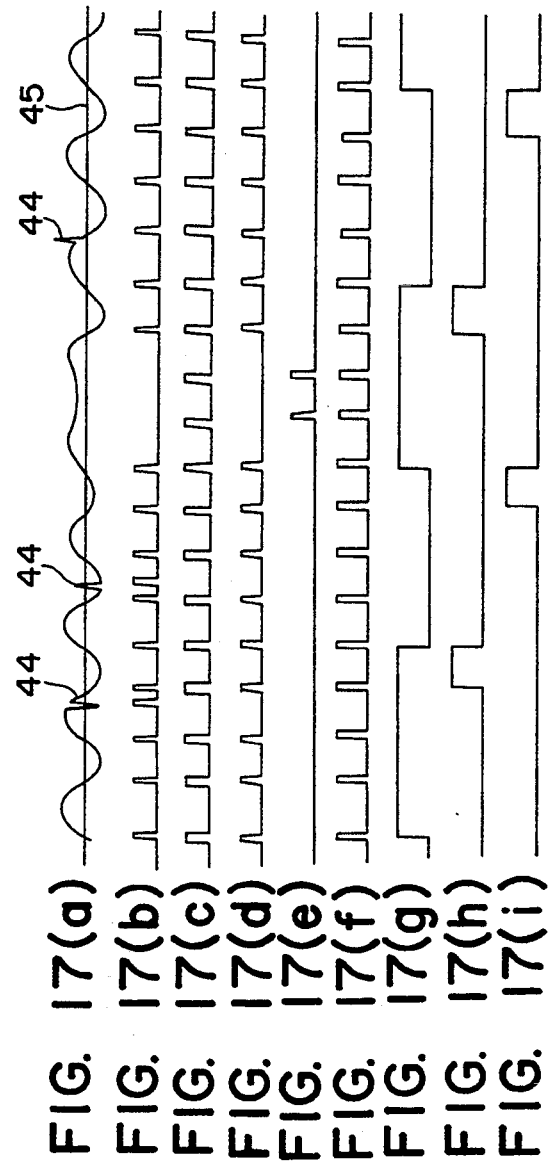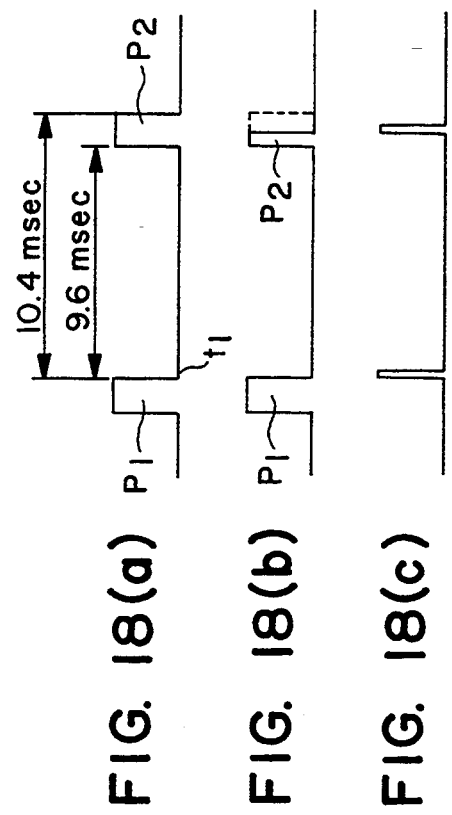

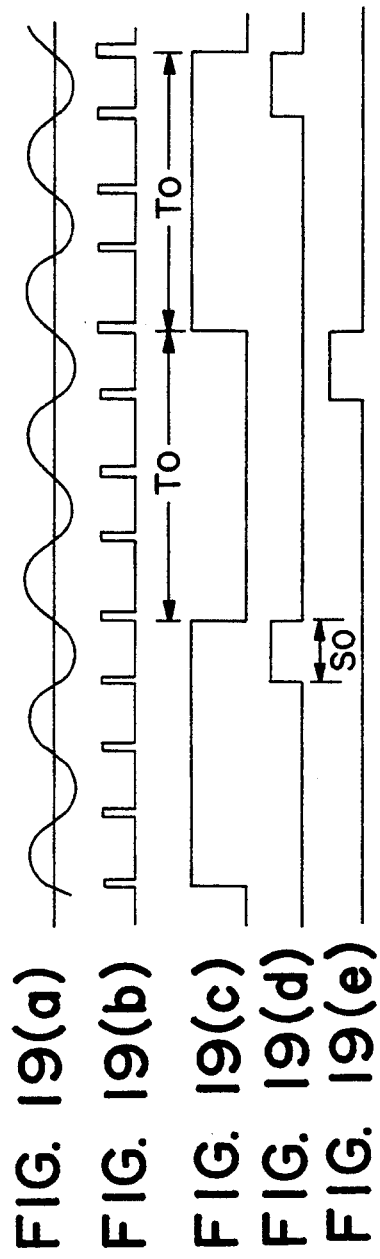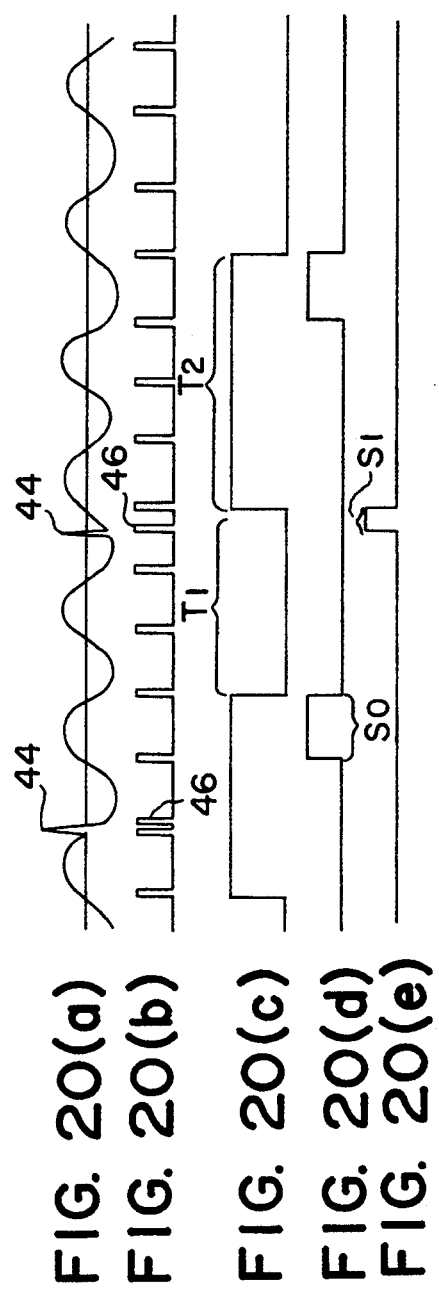

ELECTROMAGNETIC FLOWMETER

BACKGROUND OF THE INVENTION

1. Field of the Invention

This invention relates to an electromagnetic flowmeter which detects flow rate of conductive fluid flowing through a process control apparatus.

2. Description of the Prior Art

In an electromagnetic flowmeter, a principle is utilized that an output signal corresponding to flow rate of the fluid can be obtained by sampling electrical potential with a predetermined timing, which is generated in electrodes submerged in the conductive fluid flowing in a magnetic field.

Although electrochemical noise superimposes on the signal detected by the electromagnetic flowmeter, the noise is eliminated by switching polarities of exciting current. As such switching requires a predetermined time, it takes same length of time to stabilize the output performance of the electromagnetic flowmeter. Therefore, the electromagnetic flowmeter has to wait for the stabilization before it executes the sampling in order to obtain the detected signal.

Thus, the electromagnetic flowmeter requires timing which indicates the switching of polarities of exciting current and the sampling. This timing is provided by furnishing the electromagnetic flowmeter with a timing generation means. There is, however, other kinds of of noise besides the above electrochemical noise (as most of these incoming noise are caused by a commercial power supply, these noise will be mentioned as "commercial power supply noise" hereinafter except when it is necessary to distinguish the kind of noise). When the commercial power supply noise is weak, it does not interfere with the performance of the electromagnetic flowmeter. However, since the commercial power supply noise does not syncronize with the timing signal produced by the electromagnetic flowmeter, fluctuation or fluttering of the output signal distinctly appears, and moreover, a surge of the output signal, so called "beat" might be occasionally caused when an amplitude of the commercial power supply noise is great. The performance of the flowmeter can be interfered by the beat.

In the case of apparatus (four-wired electromagnetic flowmeter) driven by the commercial power supply, the apparatus can obtain the timing signal from the commercial power supply itself. Therefore, the timing signal syncronizes with the commercial power supply noise in this case, where a noise reduction effect can be expected. However, even in this case, it is actual status that such an effect as expected can not be obtained since in most of the case the commercial power supply noise from a different commercial power line superimposes on the output signal, too.

Also, in many cases of apparatus (two-wired electromagnetic flowmeter) driven by a DC power supply, fluctuation or fluttering of the output signal is caused since the output signal of the apparatus does not syncronize with the commercial power supply.

SUMMARY OF THE INVENTION

An object of the present invention is to provide an electromagnetic flowmeter which can produce timing signals synchronous with the commercial power supply noise in order to obtain a signal corresponding to flow rate of conductive fluid in a magnatic field by sampling with a predetermined timing electrical potential generated at electrodes submerged in the fluid flowing in a magnetic field.

Another object of the present invention is to obtain a steady noise reduction effect even during an incoming noise is not available by keeping exciting signal and sampling signal generating.

A further object of the present invention is to avoid out of synchronization by producing the timing signal synchronous with the commercial power supply noise even during the noise is not available.

A further object of the present invention is to obtain a stable flow rate signal and an improved noise-proof feature by producing the timing signal highly synchronous with a commercial power supply frequency which is included in the noise superimposed on the flow rate signal.

A further object of the present invention is to obtain a stable flow rate signal and an improved noise-proof feature by eliminating spiking noise and noises existing in frequency bands other than the commercial power supply.

According to the present invention, there is provided an electromagnetic flowmeter which comprises a noise detection means for detecting noise superimposed on the fluid from the electrodes, and a timing signal generation means for generating timing of producing an exciting current for generating the magnetic field and timing for the sampling based on the noise detected by the noise detection means.

In this electromagnetic flowmeter, the timing signal generation means can generate the exciting signal and the sampling signal synchronously with the incoming noise, whereby an improved noise reduction effect can be obtained.

According to another mode of the present invention, in addition to the noise detection means and the timing signal generation means, the flowmeter includes a pseudo-noise generation means which sends a pseudo-signal synchronous with the noise signal to the timing signal generation means unless the noise is detected by the noise detection means.

In this mode, since the pseudo-noise generation means generates the pseudo-noise with same period as the commercial power supply noise when the noise is lost, the exciting and sampling signals are kept available. Therefore, a steady noise reduction effect can be obtained.

The electromagnetic flowmeter according to another mode of the present invention comprises:
- a noise detection means for detecting a noise superimposed on the fluid from the electrodes and transmits a noise signal,
- a judgement means for judging whether or not the noise signal exists,
- a delay means for delaying transmission of the noise signal by a predetermined period,
- a pseudo-noise generation means for genarating a psuedo-noise signal behind the predetermined period from a time expected to detect when the judgement means judges that the noise signal does not exist, and
- a timing signal generation means for generating timing of producing an exciting current for generating the magnetic field and timing of the sampling, based on either the noise signal or the pseudo-noise signal.

According to this mode, the timing signal synchronous with noise can be produced by delaying not only the detected noise signal but also the pseudo-noise signal which generates when the noise signal is not available in a predetermined period even when the commercial power supply noise is not available.

The electromagnetic flowmeter according to the other made of the present invention comprises:

a noise detection means for detecting a noise superimposed on the fluid from the electrodes to transmit a noise signal, a filter means for picking up only component of the commercial power supply frequency from the noise signal, a pulse generation means for generating a timing pulse every half period of the commercial power supply frequency in response to an input signal of the commercial power supply frequency signal picked up by the filter means, a pseudo-noise generation means for generating a pseudo-noise signal synchronous with same period as the noise signal when the noise detection means does not transmit the noise signal, and a timing signal generation means for generating timing of producing an exciting current for generating the magnetic field and timing of the sampling, based on either the timing pulse generated by the pulse generating means or the pseudo-noise signal generated by the pseudo-noise generation means.

According to this mode, by filtering to pick up only component of the commercial power supply frequency from the noise superimposing on the flow rate signal transmitted by the electrodes with frequency components in a wide band, the timing signal highly synchronous with the commercial power supply frequency can be obtained. Therefore, not only the detected flow rate signal stabilizes, but also the noise-proof feature is improved.

A further mode of the present invention comprises:

a noise detection means for detecting a noise signal superimposing on fluid at the electrodes to tansmit a noise signal, a timing detection means for picking up only component of commercial power supply frequency from the noise signal to transmit as a timing detection signal one shot pulse signal every half period of the commercial power supply frequency, a standard timing signal output means for transmitting as a standard timing signal a pulse that becomes "H" only within a fixed period from a time of one pulse signal transmission to a time of the following pulse signal transmission, a logical product means for making logical product of the timing detection signal transmitted by the timing detection means and the standard timing signal transmitted by the standard timing signal output means, a pseudo-signal generation means for generating a pseudo-signal with same frequency as the noise signal when the noise detection means does not transmit the noise signal, and a timing signal generation means for generating timing of producing an exciting current for generating the magnetic field and timing of the sampling, based on a pulse signal output from the logical product means and a pseudo-signal output from the pseudo-signal generation means.

According to this mode, since it is possible to eliminate the spiking noise superimposing on the flow rate signal and the noise with frequencies other than the commercial power supply, the timing signal highly synchronous with the commercial power supply frequency can be obtained. Therefore, not only the detected flow rate signal stabilizes but also the noise-proof feature is improved.

BRIEF DESCRIPTION OF DRAWINGS

FIG. 9 is a diagram showing signal waveforms at each position shown in FIG. 7;

FIG. 10 is a diagram showing a judging time of the commercial power supply noise;

FIG. 11 is a diagram showing a judging time different from the case shown in FIG. 10;

FIG. 13 is a diagram showing signal waveforms at each position shown in FIG. 12;

FIG. 14 is a diagram of waveforms showing an outage of pulse every half period of the commercial power supply from the noise;

FIG. 15 is a diagram of waveforms showing an activity of generating the timing signal even when the commercial power supply noise is not available;

FIG. 17 is a diagram showing signal waveforms at each position shown in FIG. 16;

FIG. 18 shows a standard AC timing signal used in the fifth embodiment;

FIG. 19 is a diagram showing desired status of waveforms at each position in the fifth embodiment; and FIG. 20 shows status of each waveform against the commercial power supply noise including spiking noises.

DETAILED DESCRIPTION OF THE PREFERRED EMBODIMENT

Figure 1:
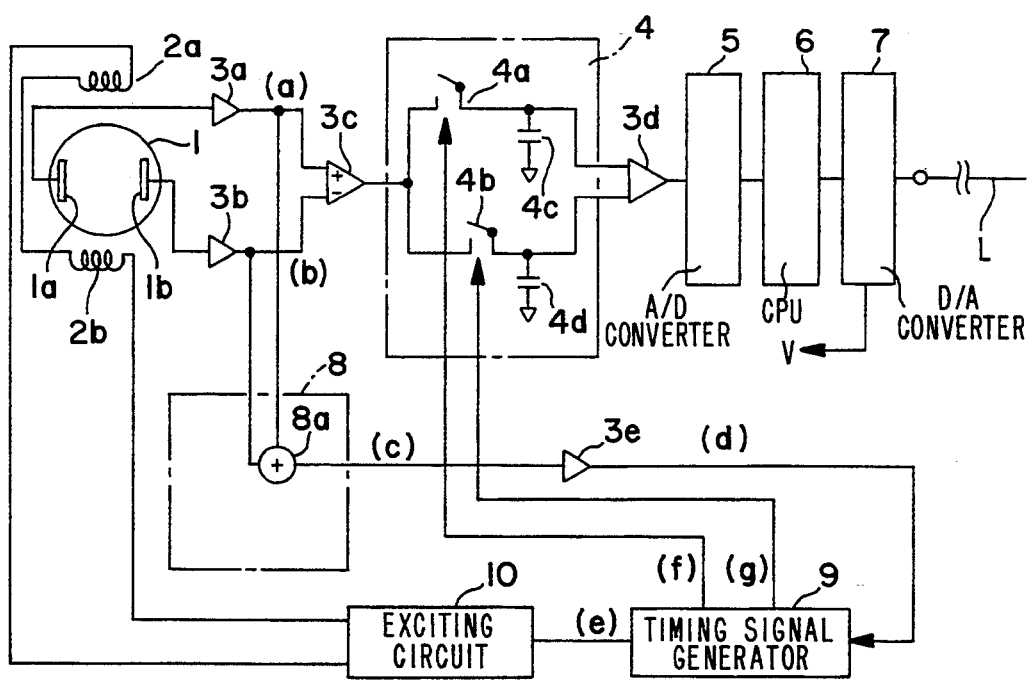
FIG. 1 is a block diagram showing one of embodiments of the present invention.

FIG. 1 is a block diagram showing one of embodiments of the present invention. In this diagram, the conductive fluid flows through a tubing 1. A magnetic field is induced by a current passing through a pair of coils 2a and 2b, and it is applied to the fluid so that a signal corresponding to flow rate of the fluid can be detected at a pair of electrodes 1a and 1b.

The detected signal is amplified by amplifiers 3a, 3b and a differential amplifier 3c, sampled by a sampling circuit 4, and through an amplifier 3d, fed to an A/D converter 5 where it is converted to digital form, processed by a CPU 6, converted to analog form by a D/A converter 7 so as to scale a mimimum flow rate to correspond to 4 mA DC and a maximum flow rate to correspond to 20 mA DC, and transmitted through two-wired conductor L. Where, the D/A converter 7 produces a voltage V for the circuit of this apparatus, based on an outer power supply fed via conductor L. As mentioned above, the commercial power supply noise generates at the electrodes 1a and 1b. This noise is amplified by the amplifiers 3a and 3b, detected by a commercial power supply noise detector 8 which consists of a device like adder 8a, and amplified by the amplifier 3e. Based on the commercial power supply noise processed as above, a timing signal generating section 9 produces a signal syncronous with the noise. In response to this signal, an exciting circuit 10 generates an exciting current, and this current is fed to the coils 2a and 2b. The timing signal generater 9 also generates sampling signals synchronous with an AC power noise, and based on this sampling signal, the generater 9 controls operation of sampling switches 4a and 4b so as to acquire data, and accumulates the data in capacitors 4c and 4d.

FIG. 2 is a view showing each waveform at each position in the circuit of FIG. 1. As shown in (a) and (b), phases of two waveforms are identical since the commercial power supply noise generates with common mode at the electrodes 1a and 1b. Therefore, by combining the two kinds of signals in the adder 8a of the commercial power supply noise detector 8, the commercial power noise can be obtained as shown in FIG. 2(c). The amplifier 3e amplifies this commercial power suply noise up to its saturation level so as to obtain a signal shown in FIG. 2(d).

Figure 2A:
FIG. 2 is a view showing each waveform at each position in the embodiment of FIG. 1.
Figure 2B:
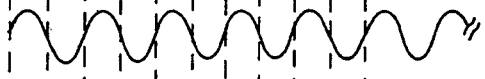
Figure 2C:
Figure 2D:
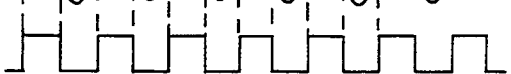
Figure 2E:
Figure 2F:
Figure 2G:

In response to this signal, the timing signal generater 9 produces an exciting signal shown in FIG. 2(e) and sampling signals shown in FIGS. 2(f) and (g). The exciting circuit 10 is driven by the exciting signal and produces the exciting current which is fed to the coils 2a and 2b. By the sampling signal, the sampling switches 4a and 4b operate so as to acquire a detected signal. The detected signal is produced only when the switches are closed. The sampling signal is produced at the end of timing of the exciting current so that the sampling timing can be steady.

Figure 3:
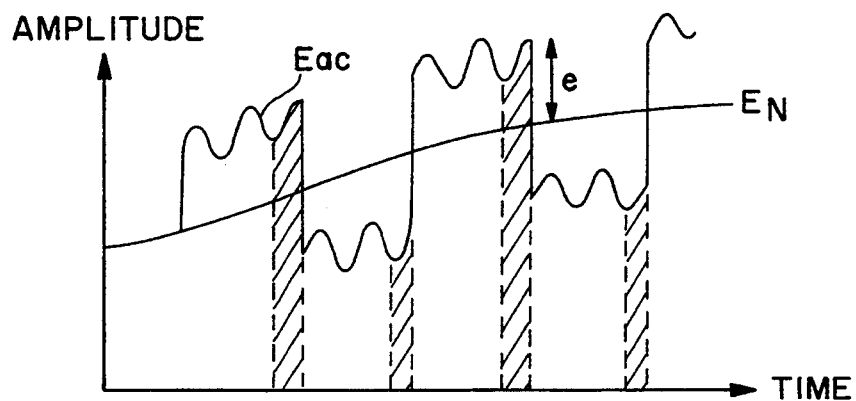
FIG. 3 shows amplitude of signals transmitted from amplifier 3c.

FIG. 3 shows amplitude of signals transmitted from the amplifier 3c. As shown, an electrochemical noise $E_N$ superimposes on a flow rate signal e which is generated at the electrodes 1a and 1b corresponding to the flow rate. Since a polarity of the exciting current changes back and forth, the amplitude of the flow rate signal e changes synchronously. A commercial power supply noise $E_{ac}$ superimposes on the flow rate signal e, and the exciting current synchronizes with the commercial power supply noise $E_{ac}$. Thus, the commercial power supply noise $E_{ac}$ synchronizes with the change of polarity mentioned above. Since the commercial power supply noise acts with a common mode, most of the noise can be eliminated by the amplifier 3c. However, a part of the noise still passes through the amplifier 3c, which is overestimated in FIG. 2 for better understanding of its activity. The portion marked with shadow in FIG. 2 represents a sampled portion of the detected signal. As shown, the sampling is executed at end of the exciting current. Since the sampling signal is also produced based on the commercial power supply noise, a period for the sampling synchronizes with the noise. The signal produced by the sampling is once accumulated in the capacitors 4c and 4d, then treated by the differential amplifier 3d. Consequently, the commercial power supply noise $E_{ac}$ is cancelled. An electrochemical noise $E_N$ is cancelled since its amplitude is almost steady over the period of the exciting signal due to its period of change being sufficiently long compared with the exciting signal.

To the contrary, since a phase of the flow rate signal e is inverted agaist the exciting signal, an amplitude of the signal is amplified to twice as high as original and transmitted from the amplifier 3d.

In the present invention, the timing is produced synchronously with the commercial power supply noise. Such commercial power supply noise is not acquired at start-up of the apparatus, it is necessary to produce the exciting current. For this situation, it is possible that the timing signal generating section 9 continues to produce the timing signal identical with the commercial power supply noise until the commercial power supply noise generates, and that when the commercial power supply noise generates, the timing signal is synchronized with the commercial power supply noise in order to obtain a desired timing signal subsequently. It is also possible that the commercial power supply noise detecting section 8 is provided with a filter which eliminates waveforms other than that with a commercial power supply frequency in order to avoid turbulence caused by the incomming noise.

Figure 4:
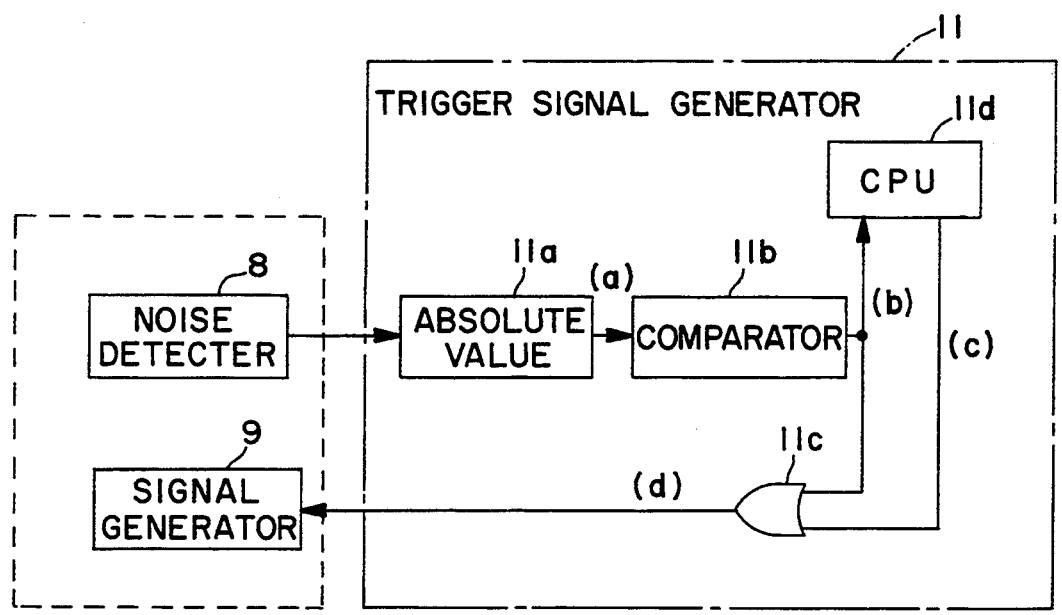
FIG. 4 is a block diagram showing a second embodiment.

FIG. 4 is a block diagram showing a second embodiment. In this diagram, as a part different from shown in FIG. 1, a constitution for function of a pseudo-noise generation is shown. The function generates a pseudo-noise when the commercial power supply noise is not available. The other constitution is the same as that of FIG. 1.

In FIG. 4, the commercial power noise is detected by the commercial power supply noise detecting section 8 and is fed to a trigger signal generating section 11. The trigger signal generating section 11 generates a trigger signal based on the commercial power supply noise while the noise is produced, and switches to generate a pseudo-noise with same period as the commercial power supply noise when the noise disappears.

Figure 5:
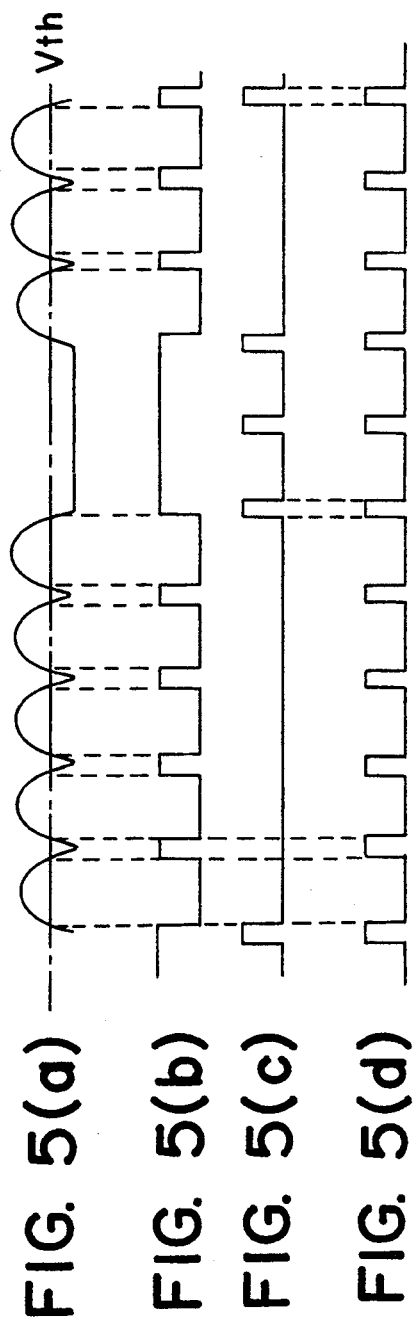
FIG. 5 is a view showing waveform at each position shown in FIG. 4.

In detail, the trigger signal generating section 11 includes an absolute value generating circuit 11a which, as shown in FIG. 5(a), takes absolute value from the commercial power supply noise detected by the commercial power supply noise detecting section 8 (that is, it transmittes amplitude of the signal with a positive polarity), a comparator 11b which, as shown in FIG. 5(b), generates pulse signal when amplitude of the noise signal in absolute value falls down below a threshold $V_{th}$, an OR circuit 11c and a CPU 11d. The section 11 feeds an output of the OR circuit 11c to the timing signal generating section 9 for a trigger signal.

The CPU 11d observes the pulse signal fed from the comparator 11b to memorize a period of the signal. When the pulse signal is not fed due to loss of the commercial power supply noise, the CPU 11d generates a pulse signal for pseudo-noise shown in FIG. 5(d). Thus, as shown in FIG. 5(e), the OR circuit 11c can keep the trigger pulse signal transmitting even when the commercial power supply noise is not available.

Figure 6:
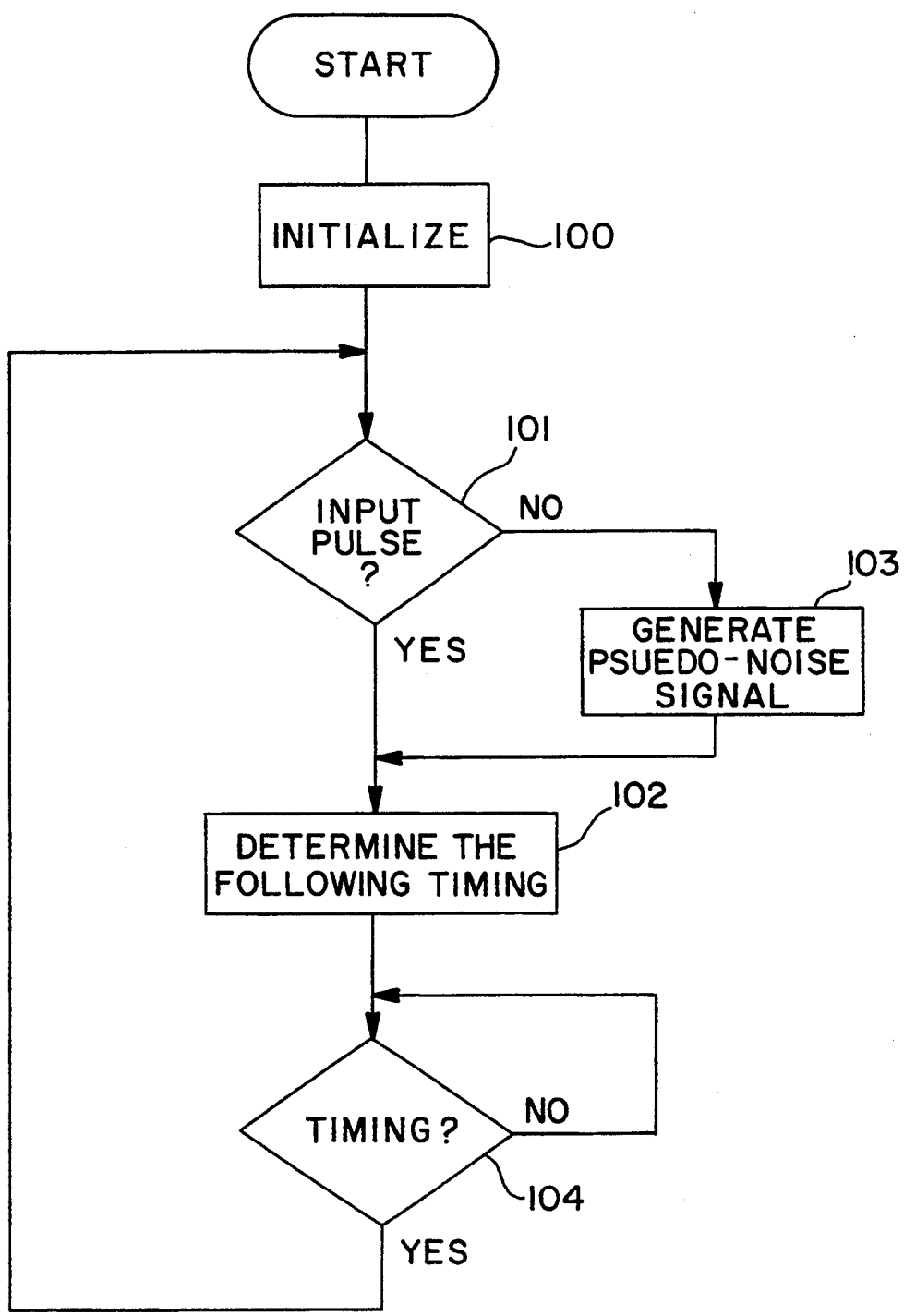
FIG. 6 is a flowchart showing a processing procedure of CPU in FIG. 4.

FIG. 6 is a flowchart showing a processing procedure or the CPU 11d.

First, the CPU 11d is initialized at step 100. If it detects an input pulse being fed to it at step 101, it determines the timing to acquire the following input pulse at step 102. If it does not detect the input pulse being fed to it at step 101, it generates a psuedo-noise signal at step 103, and proceeds to step 102.

At step 104, the CPU 11d waits for the timing determined at step 102, returns to step 101 at the timing, and repeats the same procedure.

Although the CPU 11d performs the above procedure as a means for generating the psuedo-noise in the present invention, the CPU 6 can be used for the psuedo-noise generating means in place of the CPU 11d.

The trigger signal transmitted from the trigger signal generating section 11 synchronizes with the commercial power noise. This trigger signal is fed to the timing signal generating section 9 which in turn generates the timing signal synchronous with the commercial power supply noise as mentioned above. That is, the timing signal generating section 9 can provide both of the exciting signal and the sampling signal synchronous with the commercial power supply noise without fail even when the commercial power supply noise is lost for some reason.

Although the above embodiments are described by placing a target in the commercial power supply noise, these embodiments are also applicable widen the incoming noise steadily generates with frequencies different from the commercial power noise and unneglible amplitude. For this application, it is necessary to set up a cut-off frequency of a filter by taking account of frequencies of the incoming noise except the commercial power supply noise, in the case that the filter which cuts off frequencies other than the power supply frequency is furnished in the commercial power supply noise detecting section 8.

Figure 7:
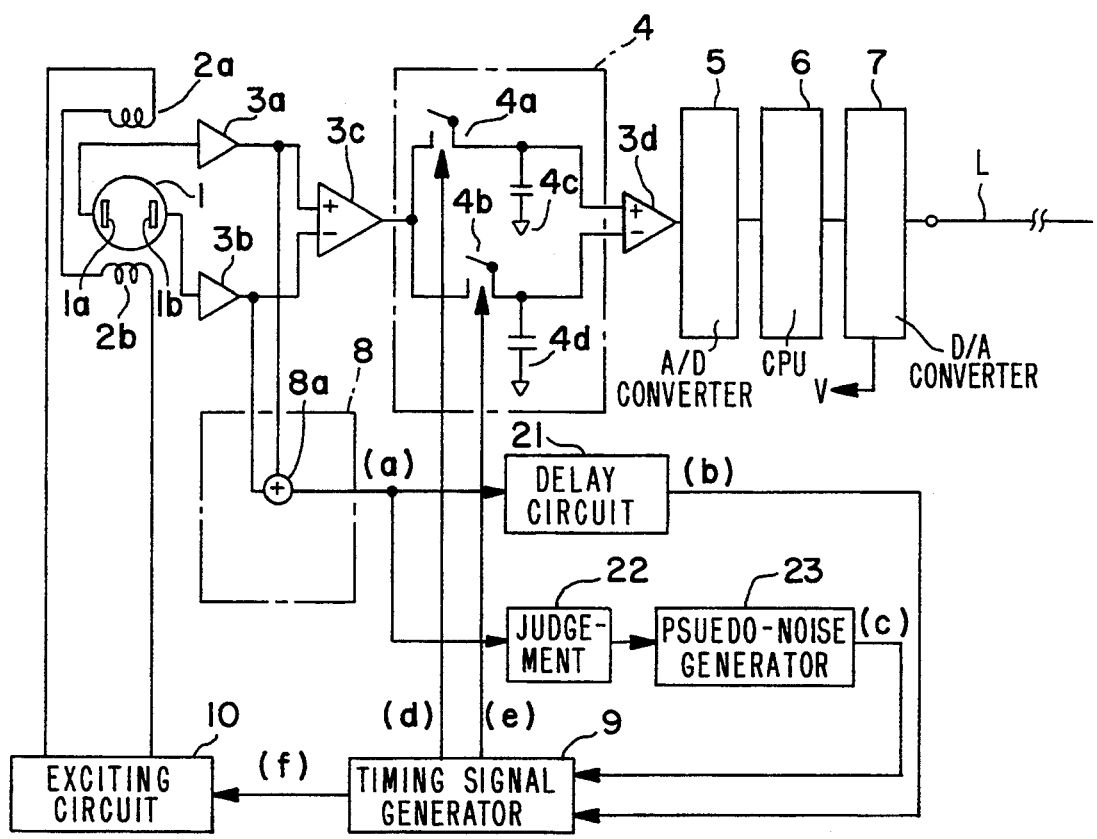
FIG. 7 shows a third embodiment.

FIG. 7 shows a third embodiment, in which the same numerals indicate the same elements in the embodiment of FIG. 1. While the description of the same elements is omitted below, the different elements are described as follows.

The commercial power supply noise detected by the commercial power supply noise detecting section 8 is fed to the timing signal generating section 9 with delay of a predetermined period through a delay circuit 21.

If the commercial power supply noise is not available for some reason, a judging section 22 judges that the commercial power supply noise is not produced in the commercial power supply noise detecting section 8. Based on this judgement, a pseudo-noise generating section 23 generates a pseudo-noise signal with same period as the commercial power supply noise, which is fed to the timing signal generating section 9. By this function, the timing signal synchronous with the comercial power supply noise can be steadily produced.

Figure 8A:
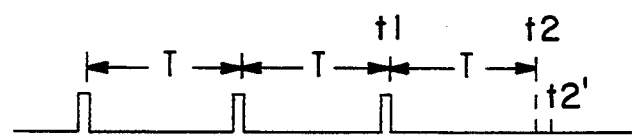
FIG. 8 is a diagram of waveforms showing activities responding to the commercial power supply frequency.
Figure 8B:
Figure 8C:
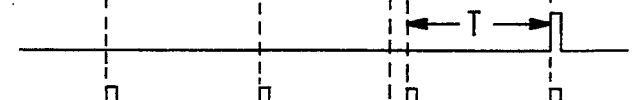
Figure 8D:

However, it is allowable that the frequency of the commercial power supply fluctuates in a predetermined range. For this allowance, it can not be judged whether the commercial power supply noise has been obtained or not before a period determined by the allowance does not terminates. Therefore, the pseudo-noise generating section 23 can generate the pseudo-noise signal when the period determined by the allowance terminates, For example, while the commercial power supply noise with a period T generates as shown in FIG. 8(A), the commercial power supply noise should he obtained at a time t2=t1+T after it was obtained at a time t1. However, even if the commercial power supply noise is not obtained at the time t2, it is necessary to judge that the commercial power supply noise is not obtained at a first time when the noise signal is not detected yet after a time t2' which is determined by the allowance since there exists the allowance for the frequency of the commercial power supply.

However, the time point t2' is not the time delayed for the period T from the time t1, but the time proceeding further by a time interval (t2'−t2). Therefore, if no correction, an asynchronization occurs and the flow rate signal becomes unstable. In order to avoid such asynchronization, it is preferable to delay the commercial power supply noise signal obtained from the commercial power supply noise detector 8 for (t2'−t2) so as to synchronize the commercial power supply noise signal with the pseudo-noise from the pseudo-noise generator 23.

Therefore, the delay circuit 21 is constituted to delay the commercial power noise signal shown in FIG. 8(A) for the interval (t2'−t2). If the judging section 22 does not receive the commercial power supply noise in an allowance time determined by the allowance of fluctuation of the commercial power supply frequency as shown in FIG. 8 (B), the judging section 22 judges no commercial power supply noise and transmittes a signal for driving the pseudo-noise generator 23. In response to this signal, the pseudo-noise generator 23 generates a pseudo-noise signal shown in FIG. 8(C). Thus, the timing signal generator 9 can generates a signal shown in FIG. 8(D), synchronously with the output from the delay circuit 21 or the pseudo-noise signal from the pseudo-noise generator 23.

FIG. 9 is a diagram showing waveforms in each position in the embodiment shown of FIG. 7.

Here, the commercial power supply noise shown in FIG. 9(a) is transmitted from the commercial power supply noise detector 8. The commercial power supply noise signal is fed to the timing signal generator 9 with a predetermined delay time D as shown in FIG. 9(b). This delay time D is determined by the allowance of fluctuation in the commercial power supply frequency as mentioned above.

Now, provided that the commercial power supply noise which should generate at a time t1, t2 or t3, respectively, did not generate, the judging section 22 judges no commercial power supply noise at a time delayed by the time D, and transmittes a signal to drive the pseudo-noise genarating means 23 so as to generate the pseudo-noise signal shown in FIG. 9(c).

In resonse to a signal shown in FIGS. 9(b) or (C), the timing signal generator 9 generates the sampling signals shown in FIGS. 9(d) and (e) and the exciting signal shown in FIG. 9(f).

Next, FIG. 10 shows a case that a time required to judge in the judging section 22 is set to twice as long as the delay time D.

The judging time is set to a length of ±D as shown in (c) with a center at the the time of the commercial power supply noise generation shown in (a). Therefore, the signal delayed for the time D is transmitted from the delay circuit 21 as shown in (b), and the driving signal for producing the pseudo-noise is transmitted from the judging section 22 at the end of the judging time 2D when the scheduled commercial power supply noise is not generated.

According to the above function, since only one kind of time (time D) is controlled, the circuit constitution can be simplified.

FIG. 11 shows another case for the judging time setting.

In this case, although the delay time is to set to the same length D as in FIG. 10, the judging time is set to a value D' shorter than 2D. The pseudo-noise does not generate immediately when the time D' passed, but generates at a time when the delay time D passed since the scheduled time t1 for the commercial power supply noise generation.

Though there is an inconveniency to control two kinds of time (D and D'), the above manner is effective when the fluctuation of the commercial power supply noise is smaller, and a possibility of malfunction is minimized since the judging time is shorter.

Figure 12:
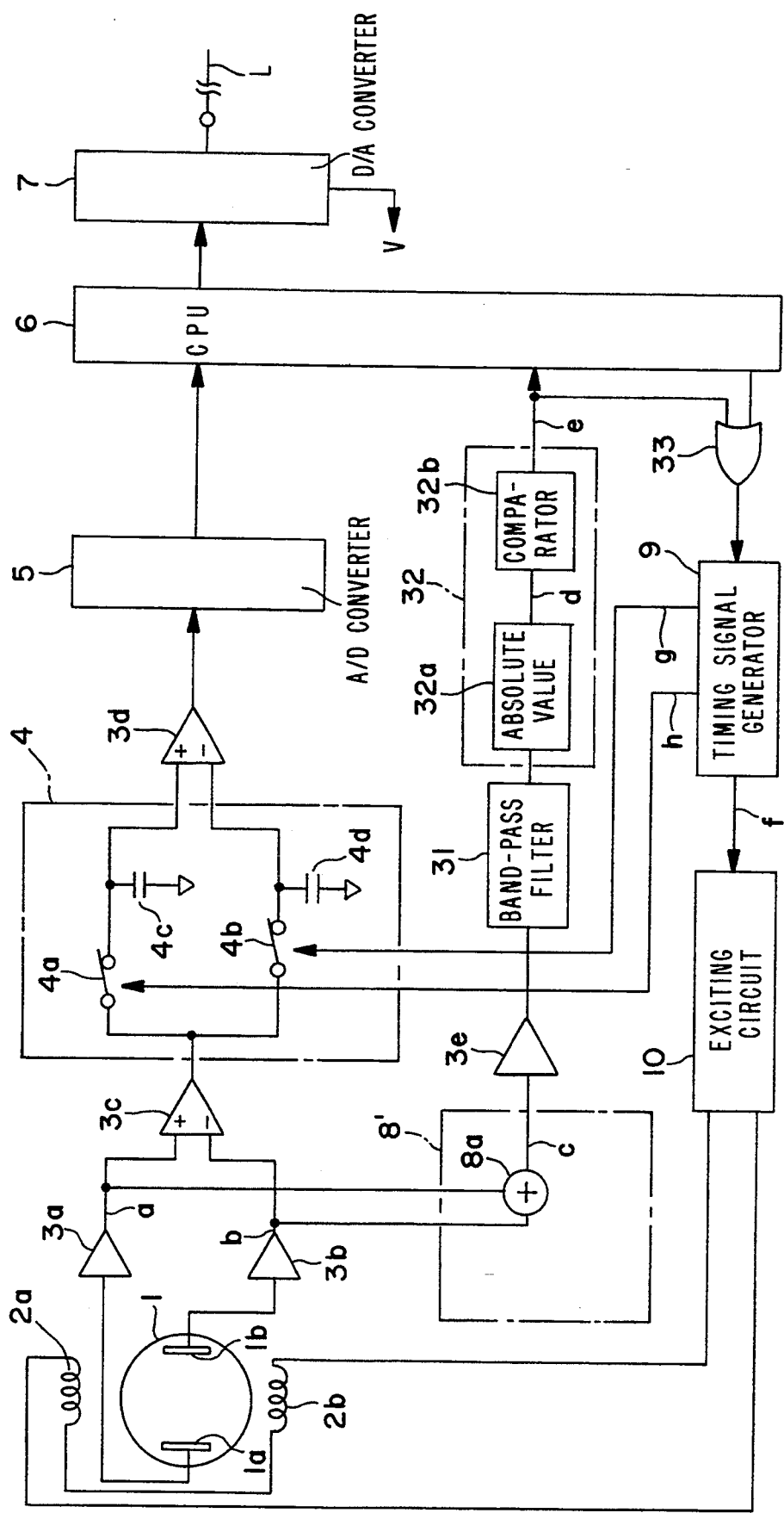
FIG. 12 is a block diagram showing a fourth embodiment.

Next, FIG. 12 shows a fourth embodiment, in which the same numerals indicate the same elements in the first embodiment of FIG. 1. While the description of the same elements is omitted below, the different elements are described as follows.

As mentioned above, the incoming noise including the commercial power supply noise generating at the electrodes 1a and 1b, is amplified by the amplifiers 3a and 3b, and detected by a noise detector 8' constituted by a device like the adder 8a. After the detected noise signal is amplified by the amplifier 3e, it is picked up as only a noise with a component of the commercial power supply frequency by a band-pass filter 31 with a band pass characteristic for 50 to 60 Hz.

The commercial power supply noise picked up as above, is converted to a pulse signal with a timing every half period of the commercial power supply ferequency by a pulse generator 32. This pulse signal is fed to the CPU 6, and also fed to the timing signal generator 9 through an OR circuit 33.

FIG. 13 is a diagram showing each waveform at each position in FIG. 12. As two kinds of incoming noise generate as common mode noise-at the electrodes 1a and 1b, these phases are even as shown in FIGS. 13(a) and (b). Therefore, a noise shown in FIG. 13(c) is produced by combininig both signals by the adder 8a in the noise detector 8'. By amplifying the noise in the amplifier 3e and passing it through the band-pass filter 31, the power supply noise signal is obtained. This signal is sent to the pulse generator 32, where an absolute value is taken out from the signal as shown in FIG. 13(d) by an absolute value circuit 32a in the generator 32. When the absolute value falls down below the threshold $V_{th}$, a comparator 32b transmittes the pulse signal every half period of the commercial power supply frequency as shown in FIG. 13(e). This pulse signal is sent to the timing signal generator 9 through the OR circuit 33.

In response to the pulse signal, the timing signal generator 9 generates the exciting signal shown in FIG. 13(f) and the sampling signal shown in FIGS. 13(g) and (h). After that, as mentioned above, the exciting circuit 10 is driven by the exciting signal, and the produced exciting current is fed to the coils 2a and 2b. By the sampling signal, the sampling switches 4a and 4b operate so as to acquire the detected signal. The detected signal is acquired only when the switch is closed. Where, the sampling signal is produced at the end of timing of the exciting current so that the stable detected signal can be sampled as mentioned above.

As mentioned above, in the embodiment of FIG. 12, the incoming noise superimposing on the detected signal is detected by the noise detector 8', only noise with a component of the commercial power supply frequency is picked up by the band-pass filter 31, the pulse signal every half period of the commercial power supply frequency is produced by the pulse generator 32, and the timing signal is produced by the timing signal generator 9 based on the pulse signal. Since this timing signal is synchronous with the commercial power supply noise, the noise reduction effect can be expected.

Concretely, the noise superimposed at the electrodes 1a and 1b include frequency components over a wide band as shown in FIG. 14(a). Therefore, it is affected by the other kind of frequency components to obtain the pulse with timing every half period of the commercial power supply frequency (50 Hz [period T=10 msec] in the eastern area of Japan and 60 Hz [period T=8.3 msec] in the western area of Japan) as shown in FIG. 14(c), and an accuracy for detection is degraded. That is, as shown in FIG. 14(b), an frequency error $\alpha$ is caused between the signal and the commercial power supply noise, and this causes fluctuation and fluttering of the flow rate signal.

To the contrary, in the embodiment shown in FIG. 12, since only component of the commercial power supply frequency is picked up from the noise with wide band frequency components, the timing signal highly synchronous with the commercial power supply frequency can be produced. Consequently, the flow signal gets stable and the noise-proof feature is improved.

Characteristic of the band-pass filter 3i is not only for the frequency components of 50 to 60 Hz, but can be for either only 50 Hz or only 60 Hz. For the constitution of the filter, a by-pass filter constituted with C (capacitor) and R (resistor), a low-pass filter, or a high order filter can be used. A high order active filter constituted by C, R and operational amplifier can be used.

In the case that the commercial power supply noise is not available for some reason, the CPU 6 detects that the commercial power supply noise is not produced by the commercial power supply noise detector 8', and produces to feed the pseudo-noise signal synchronous with the commercial power supply noise to the timing signal generator 9. By this function, the timing signal synchronous with the commercial power supply noise can be steadily produced widen the commercial power supply noise is not available.

In detail, from the commercial power supply noise produced by the band-pass filter 31, an absolute value is taken out as shown in FIG. 15(a) by the absolute value circuit 32a in the pulse generator 32. When the absolute value falls down below the threshold $V_{th}$, a comparator 32b transmittes the pulse signal shown in FIG. 15(b). This pulse signal is fed as a trigger signal to the timing signal generator 9.

The pulse signal is also fed to the CPU 6. The CPU 6 observes the pulse signal and memorizes its period. When the pulse signal is not fed due to loss of the commercial power supply noise, the CPU 6 generates the pulse signal with the memorized period as the pseudo-noise. By this function, the OR circuit 33 keeps transmitting the trigger pulse signal even a period $T_a$ while the commercial power supply noise is not available, as shown in FIG. 15(d). By this function, the timing signal generator 9 can generate the exciting signal and the sampling signal synchronous with the commercial power suply noise.

The activity that the CPU 6 generates the pseudo-noise signal while the commercial power supply noise is not available, is same as that shown in the flowchart of FIG. 6.

Figure 16:
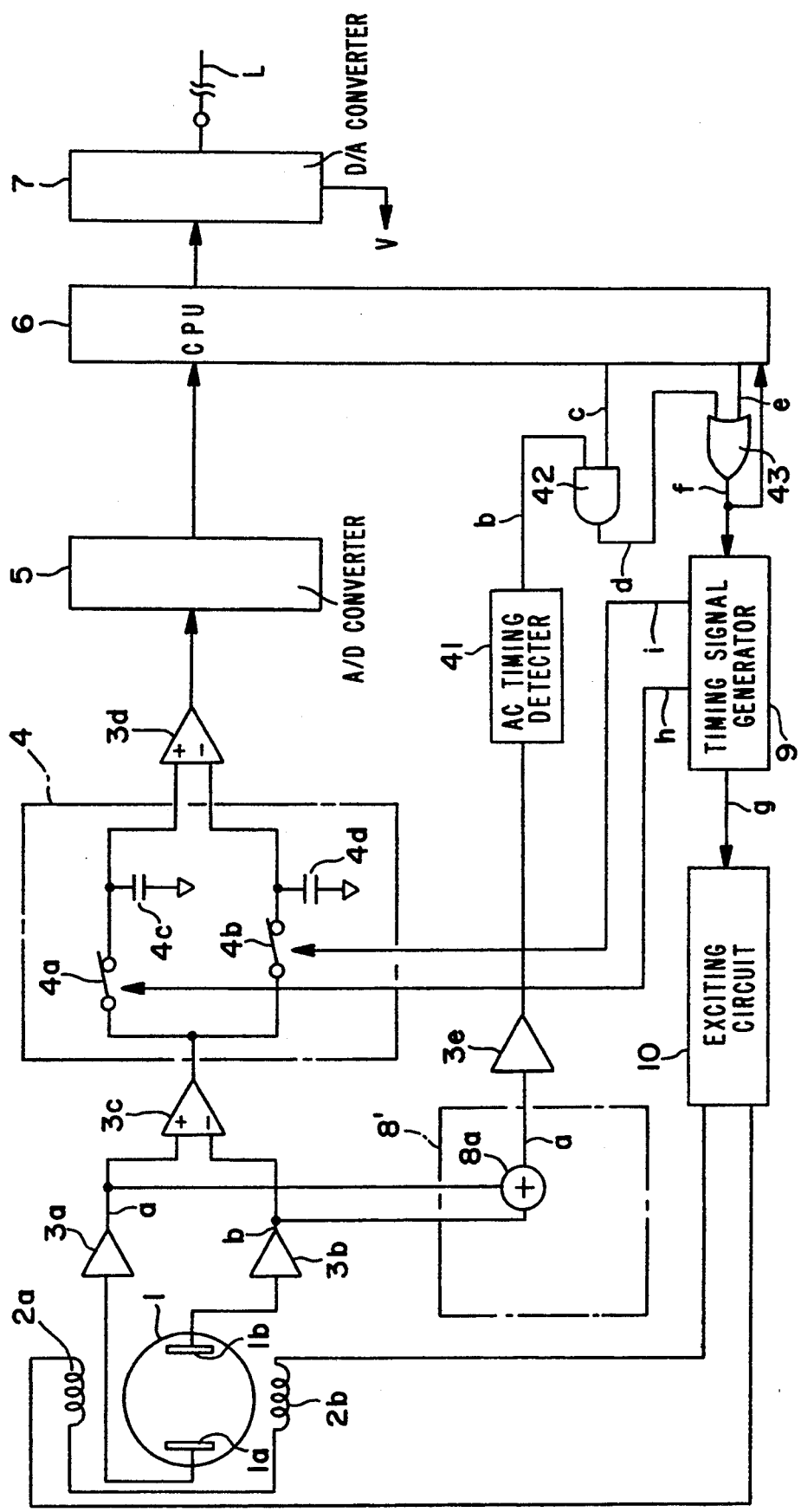
FIG. 16 is a block diagram showing a fifth embodiment.

Next, FIG. 16 shows a fifth embodiment, in which the same numerals indicate the same elements in the embodiments of FIGS. 1 and 12. While the description of the same elements is omitted below, the different elements are described as follows.

As mentioned above, the incoming noise including the commercial power supply noise generating at the electrodes 1a and 1b is amplified by the amplifier 3a and 3b, and detected by the noise detector 8' constituted by the adder 8a. The detected noise signal which is amplified by the amplifier 3e, is converted to the pulse signal corresponding to every half period of commercial power supply frequency by an AC (the commercial power supply) timing detector 41. In detail, the AC timing detector 41 picks up only the commponent of the commercial power supply frequency from the incoming noise amplified by the amplifier 3e, and transmittes one shot pulse as the timing detection signal every half period of the frequency.

This timing signal is fed to an AND circuit 42. The AND circuit 42 makes a logical product of the timing detection signal and a standard AC timing signal output from the CPU 6 as mentioned later, and the logical product signal is fed to the timing signal generator 9 and the CPU 6 through an OR circuit 43.

FIG. 17 is a diagram showing each waveform at each position in FIG. 16. As two kinds of incoming noise generate as common mode noise at the electrodes 1a and 1b, these phases are even as mentioned above. Therefore, a noise shown in FIG. 17(a) is produced by combining both signals by the adder 8a in the noise detector 8'. This noise signal occasionally includes a spiking noise 44. In this diagram, a horizontal line 45 represents a zero-cross point.

The noise signal, which is amplified by the amplifier 3e, is compared with the zero-cross point. Consequently, the one shot pulse signal is produced every half period of the commercial power supply frequency as shown in FIG. 17(b), and is fed to the AND circuit 42. The CPU 6 adds, as a preassumed standard AC timing signal, a pulse signal which becomes "H" only in a period from a time widen the AC timing detector 41 outputs a pulse signal to a time when the detector 41 outputs the following pulse signal shown in FIG. 17(c), to the AND circuit 42. Therefore, the AND circuit 42 outputs a logical product pulse signal as shown in FIG. 17(d) by taking the logical product of the two kinds of input. In this signal, the part where the timing is lost is compensated by a pseudo-signal shown in FIG. 17(e) outputted from the CPU 6 as mentoned later. Consequently, the the OR circuit 43 outputs a pulse signal as shown in FIG. 17(f) to the timing signal generator 9.

Based on this pulse signal, the timing signal generator 9 generates the exciting signal shown in FIG. 17 (g) and the sampling signals shown in FIG. 13(h) and (i). After that, as mentioned above, the exciting circuit 10 is driven by the exciting signal and the produced exciting current is fed to the induction coils 2a and 2b. By the sampling signal, the sampling switches 4a and 4b operate so as to produce the detected signal only when the switch is closed. Where, the sampling signal is produced at the end of timing of the exciting current so that the stable detected signal can be sampled as mentioned above.

Here, for example, in the case of commercial power supply (50 Hz) in the eastern area of Japan, by assuming the fluctuation band of the commercial power supply frequency (48 to 52 Hz), a standard is placed in that the standard AC timing signal becomes "H" in a fixed period [9.6 msec to 10.4 msec] from a timing $t_1$ for a pulse $P_1$ to a timing for the following pulse $P_2$ as shown in FIG. 18 (a). When the following pulse $P_2$ is "H" as shown in FIG. 18(b), the pulse $P_2$ immediately gets "L" if the AC timing detector 41 outputs one shot pulse signal shown in FIG. 18(c).

As mentioned above, in the embodiment of FIG. 16, the noise detector 8' detects the incoming noise superimposing together with the detected signal. By eliminating the spike noise and the noise in a band other than the commercial supply frequency from the incoming noise, the pulse signal highly synchronous with the commercial power supply frequency is produced, and the timing signal generator 9 generates the timing signal based on such pulse signal. Since this timing signal is synchronous with the commercial power suply noise, the noise reduction elect can be expected.

Concretely, the noise superimposing at the electrodes 1a and 1b includes frequency components in wide band as mentioned above. Above all, the commercial power supply noise is comparatively great, and imposes on both of the electrodes 1a and 1b with common mode. When the pulse signal is produced from this commercial power supply noise at a timing every half period of the noise, there is a possibility that a timing pulse different from the desired commercial power supply noise generates if a noise level of the other frequency component is high or a spiking noise as shown in FIG. 20(a) superimposes.

Therefore, in the case that the timing signal for the switching of the exciting current and for the sampling of the detected signal is produced by a pulse signal shown in FIG. 20(b), the timing which should exist in a fixed period $T_0$ shown in FIG. 19(c) is transfered to a different period $T_1$ or $T_2$ due to a pulse 46 as shown in FIG. 20(c). Therefore, such status can be induced that the sampling timing is out of point as shown in FIG. 20(d), and that the sampling time which should exist in a fixed period $S_0$ as shown in FIG. 19(d) gets shorter period $S_1$ as shown in FIG. 20(e). Consequently, the sampling is not executed properly, which causes the fluctuation on the output signal.

To the contrary, in the embodiment of FIG. 16, when the pulse signal having every half period of the commercial power supply is produced need from the incoming noise, the pulse signal which becomes "H" only in a fixed period from a timing for transmitting a pulse to a timing for transmitting the following pulse is used as the preassumed standard AC timing. By taking a logical product of the signal and the output signal from the AC timing detector 41, the noise with a frequency different from the commercial power suply frequency is not detected. That is, even if the noise with the various kinds of frequency components superimpose, only the commercial power supply noise can be steadily selected, and the exciting and the sampling synchronous with a quotient of the commercial power supply frequency being derided by even number can be executed. Consequently, the steady output signal of the electromagnetic flowmeter and the improved noise-proof feature can be obtained.

When the commercial power supply noise is not available for some reason, the CPU 6 detects that the commercial power supply noise is not produced in the commercial power supply noise detector 8'. Based on this detection, the CPU 6 produces to feed the pseudo-noise signal synchronous with the commercial power supply noise to the timing and produces to feed the pseudo-noise signal synchronous with the commercial power supply noise to the timing signal generator 9. By this function, the timing signal synchronous with the commercial power supply noise can be steadily produced when the commercial power supply noise is not available.

In detail, the pulse signal output from the OR circuit 43 is also fed to the CPU 6. The CPU 6 observes the pulse signal and memorizes its period. When the pulse signal is not fed due to loss of the commercial power supply noise, the CPU 6 generates the pulse signal with the memorized period as the pseudo-noise as shown in FIG. 17(e). By this function, the OR circuit 43 keeps transmitting the pulse signal even a period while the commercial power supply noise is not available, as shown in FIG. 17(f). By this function, the timing signal generator 9 can generate the exciting signal and the sampling signal synchronous with the commercial power supply noise without fail. That is, since the amplitude of the noise is minimized, even if the detection of the noise is out of point or it becomes impossible to detect the noise, the exciting and the sampling can be steadily executed synchronously with the commercial power supply frequency.

The activity that the CPU 6 generates the pseudo-noise signal while the comercial power supply noise is not available as mentioned above, is same as that shown in the flowchart of FIG. 6.

What is claimed is:

1. An electromagnetic flowmeter for detecting a signal corresponding to flow rate of a conductive fluid in an imposed magnetic field by sampling electrical potential generated at electrodes submerged in said fluid, which comprises:
   a noise detection means for detecting noise superimposed on said fluid from said electrodes to produce a noise signal; and
   a timing signal generation means for generating timing of an exciting current for generating said magnetic field and timing of said sampling, wherein said timing signal is generated in synchronization with said noise signal and wherein said timing of said sampling is generated at a fixed delay subsequent to a change in polarity of said exciting current.

2. The electromagnetic flowmeter according to claim 1, which further comprises a pseudo-noise generation means for sending a pseudo-noise signal substantially synchronous with said noise signal to said timing signal generation means when said noise signal is not detected by said noise detection means.

3. An electromagnetic flowmeter for detecting a signal corresponding to flow rate of conductive fluid in an imposed magnetic field by sampling electrical potential generated in electrodes submerged in said fluid, which comprises:
   a noise detection means for detecting noise superimposed on said fluid from said electrodes to produce a noise signal;
   a detector logic means for determining whether or not said noise signal exists;
   a delay means for delaying transmission of said noise signal by a predetermined period;
   a pseudo-noise generation means for generating a pseudo-noise signal synchronized with said predetermined period when said detector logic means determines that said noise signal is not present; and
   a timing signal generation means for generating timing of an exciting current for generating said magnetic field and timing of said sampling, wherein said timing signal of said exciting current is generated in substantially constant synchronization with change in polarity of said noise signal or said pseudo-noise signal.

4. An electromagnetic flowmeter for detecting a signal corresponding to flow rate of conductive fluid in an imposed magnetic field by sampling electrical potential generated at electrodes submerged in said fluid, which comprises:
   a noise detection means for detecting a noise superimposed on said fluid to transmit a noise signal;
   a filter means for picking up only the commercial power supply frequency component from said noise signal;
   a pulse generation means for generating a timing pulse at each polarity change of every half period of said commercial power supply frequency in response to an input signal of said commercial power supply frequency picked up by said filter means;
   a pseudo-noise generation means for generating a pseudo-noise signal synchronous with same period as said noise signal when said noise detection means does not transmit said noise signal; and
   a timing signal generation means for generating timing of an exciting current for generating said magnetic field and timing of said sampling, delayed for a fixed period after said timing pulse generated by either said pulse generation means or said pseudo-noise signal generated by said pseudo-noise generation means.

5. An electromagnetic flowmeter for detecting a signal corresponding to flow rate of conductive fluid in a magnetic field by sampling with a predetermined timing electrical potential generated in electrodes submerged in said fluid, which comprises:
   a noise detection means for detecting a noise superimposed on said fluid at said electrodes to transmit a noise signal;
   a timing detection means for detecting the commercial power supply frequency from said noise signal to transmit as a timing detection signal one shot pulse signal every half period of said commercial power supply frequency;
   a standard timing signal output means for transmitting as a standard timing signal a pulse that becomes "High" for a fixed duration within an interval from a time of one pulse signal transmission to a time of the following pulse signal transmission;
   a logical product means for making logical product of said timing detection signal transmitted by said timing detection means and said standard timing signal transmitted by said standard timing signal output means;
   a pseudo-signal generation means for generating a pseudo-signal with same frequency as the noise signal when said noise detection means does not transmit said noise signal; and
   a timing signal generation means for generating timing of producing an exciting current for generating said magnetic field and timing of said sampling, triggered by a pulse signal output from said logical product means or a pseudo-signal output from said pseudo-signal generation means.

* * * * *